(12) United States Patent

Gu et al.

(10) Patent No.: US 12,643,150 B2

(45) Date of Patent: Jun. 2, 2026

(54) METHOD FOR MANUFACTURING NON-SUPPORT LASER ADDITIVE MATERIAL APPLIED TO OVERHANGING STRUCTURE IN METAL MATERIAL

(71) Applicant: NANJING UNIVERSITY OF AERONAUTICS AND ASTRONAUTICS, Jiangsu (CN)

(72) Inventors: Dongdong Gu, Jiangsu (CN); Xin Liu, Jiangsu (CN); Wenxin Chen, Jiangsu (CN); Jianfeng Sun, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 0 days.

(21) Appl. No.: 19/248,502

(22) Filed: Jun. 25, 2025

(65) Prior Publication Data

US 2026/0001136 A1 Jan. 1, 2026

(30) Foreign Application Priority Data

Jun. 28, 2024 (CN) .......................... 202410860095.8

(51) Int. Cl.
B22F 10/38 (2021.01)
B22F 10/28 (2021.01)
(Continued)

(52) U.S. Cl.
CPC ............ B22F 10/385 (2021.01); B22F 10/28 (2021.01); B22F 10/36 (2021.01); B33Y 10/00 (2014.12); B33Y 80/00 (2014.12)

(58) Field of Classification Search
CPC ........ B22F 10/385; B22F 10/28; B22F 10/36; B33Y 10/00; B33Y 80/00
See application file for complete search history.

(56) References Cited

U.S. PATENT DOCUMENTS

2015/0306667 A1 10/2015 Yao
2025/0178089 A1* 6/2025 Leung ................... B22F 10/366

FOREIGN PATENT DOCUMENTS

CN 116160015 5/2023
CN 116160015 A * 5/2023 .............. B22F 10/28
(Continued)

OTHER PUBLICATIONS

Zhao et al., The effect of energy input on reaction, phase transition and shape memory effect of NiTi alloy by selective laser melting, Journal of Alloys and Compounds vol. 817, Mar. 15, 2020, 153288 (Year: 2020).*

(Continued)

*Primary Examiner* — Rebecca Janssen
(74) *Attorney, Agent, or Firm* — JC ONE WORLD

(57) ABSTRACT

A method for manufacturing a non-support laser additive material applied to a difficult-to-machine overhanging structure in an easily-deformed metal material, forming a metal non-supported overhanging structure by adopting a laser powder melting the metal power, in a process of laser-melting metal powder layer by layer to form forming layers of the metal non-supported overhanging structure, when a current forming layer is equipped with an overhanging area relative to a previous forming layer, the overhanging area of the current forming layer is formed by a S1 forming strategy; when the previous forming layer is equipped with an over-hanging area, an area where the overhanging area of the current forming layer overlaps with that of the previous forming layer is formed by a S2 forming strategy; and remaining areas are all formed by a S0 forming strategy.

4 Claims, 5 Drawing Sheets

(51) Int. Cl.
    *B22F 10/36*        (2021.01)
    *B33Y 10/00*        (2015.01)
    *B33Y 80/00*        (2015.01)

(56)                 References Cited

FOREIGN PATENT DOCUMENTS

| CN | 118060563 | | 5/2024 | |
| CN | 118060563 A | * | 5/2024 | ............. B33Y 10/00 |

OTHER PUBLICATIONS

"Office Action of China Counterpart Application", issued on Jan. 4, 2025, with English translation thereof, p. 1-p. 21.

* cited by examiner

METHOD FOR MANUFACTURING NON-SUPPORT LASER ADDITIVE MATERIAL APPLIED TO OVERHANGING STRUCTURE IN METAL MATERIAL

CROSS-REFERENCE TO RELATED APPLICATION

This application claims the priority benefit of China application serial no. 202410860095.8, filed on Jun. 28, 2024. The entirety of the above-mentioned patent application is hereby incorporated by reference herein and made a part of this specification.

BACKGROUND

Technical Field

The present disclosure belongs to the field of manufacturing metal additive material, and in particular to a method for manufacturing a non-support laser additive material applied to a difficult-to-machine overhanging structure in an easily-deformed metal material.

Description of Related Art

During the laser powder bed melting process of overhanging structures, the unmelted powder particles below the overhanging structures have poor heat dissipation capacity, causing the overhanging part to overheat, thereby exacerbating the problems of residual stress and warping. Therefore, the support structures are introduced for requirements. However, the design and addition of support structures require additional post-processing steps, which greatly limits the applicability of complex designs, including the removal of support structures and the surface finishing of parts, thereby increasing the time and cost of manufacturing, and having a potential risk of part damage.

The manufacturing technology of the non-supported laser additive material achieves a highly customized manufacturing process by minimizing material consumption, reducing support removal time and post-processing workload, thereby effectively reducing manufacturing costs and improving production efficiency. However, in the process of manufacturing non-supported laser additive material of the metal overhanging structure, the molten pool sinks under the combined action of gravity and capillary force, exacerbating the phenomenon of powder adhesion and slag on the lower surface of the structure, resulting in increased surface roughness of the structure, distortion of geometric features, and even warping deformation.

The spread of the molten pool is related to the solidification time $t_s$ of the metal droplets during the forming process and is expressed as follows:

$$t_s = \frac{s^2 k}{3 a k_{sub}} \left[ \ln \left( \frac{T_0 - T_{sub}}{T_1 - T_{sub}} \right) + \left( 1 + \frac{k_{sub}}{2k} \right) \frac{L}{C(T_1 - T_{sub})} \right]$$

where s denotes the initial droplet size, k denotes the thermal conductivity, $K_{sub}$ denotes the thermal conductivity of the matrix, $T_0$ denotes the initial temperature of the droplet, $\alpha$ denotes the thermal diffusion coefficient, C denotes the specific heat capacity, $T_1$ denotes the liquidus temperature, and $T_{sub}$ denotes the matrix temperature.

In a case where the input of the laser energy is sufficient, the energy carried by the molten droplet increases the solidification temperature of the molten droplet and reduces the solidification time, which is beneficial to reduce the slag caused by the melt in the molten pool penetrating into the powder gap and reduce the surface roughness.

Therefore, by adjusting the process parameters reasonably, the solidification time $t_s$ of the molten pool can be effectively controlled, thereby optimizing the melting state of the overlap area and reducing defects such as powder sticking and slag. This method based on process parameter adjustment provides an effective improvement strategy for the manufacturing non-supported laser additive material with metal overhang structure.

SUMMARY

In view of the problem that during the manufacturing process of the laser additive material of the metal non-supported overhanging structure, the melt seeps severely under the action of gravity, causing partial melting of powder particles and adhesion to the lower surface of the structure, seriously affecting the forming quality, the present disclosure provides a method for manufacturing a non-support laser additive material applied to a difficult-to-machine overhanging structure in an easily-deformed metal material.

In order to achieve the above technical objectives, the present disclosure adopts the following technical solutions.

Provided is a method for manufacturing a non-support laser additive material applied to a difficult-to-machine overhanging structure in an easily-deformed metal material, forming a metal non-supported overhanging structure by adopting a laser powder bed melting technology. In a process of laser-melting metal powder layer by layer to form forming layers of the metal non-supported overhanging structure, when a current forming layer is equipped with an overhanging area relative to a previous forming layer, the overhanging area of the current forming layer is formed by a S1 forming strategy; when the previous forming layer is equipped with an overhanging area, an area where the overhanging area of the current forming layer overlaps with that of the previous forming layer is formed by a S2 forming strategy; and remaining areas are all formed by a S0 forming strategy.

The S0 forming strategy is a fixed power forming strategy, and an adopted laser power is a densification laser power $P_0$, and the densification laser power $P_0$ is capable of ensuring that metal powder of the current forming layer is fully melted and densified.

The S1 forming strategy is a low-power forming strategy, and an adopted laser power is a low laser power $P_L$, the low laser power $P_L$ is capable of ensuring that the metal powder of the current forming layer is partially melted.

The S2 forming strategy is a high-power forming strategy, and an adopted laser power is a high laser power $P^+$, the high laser power $P^+$ is capable of ensuring that the metal powder in a third forming area of the previous forming layer is re-melted, in a case where the metal powder of the current forming area is completely melted.

The densification laser power $P_0$, the low laser power $P_L$, and the high laser power $P^+$ satisfy that $P_L < P_0 < P^+$.

Preferably, the forming a metal non-supported overhanging structure by adopting a laser melting metal powder specifically includes following steps.

In Step 1, the metal overhanging structure is sliced.

The metal overhanging structure is divided into N forming layers, and the forming layers are sequentially recorded from bottom to top as the first forming layer, the second forming layer, . . . the i-th forming layer, . . . and the N-th forming layer.

In Step 2, the metal overhanging structure is manufactured by using the laser additive material.

The metal powder is melted by the laser layer by layer to form the forming layers until the additive material of the metal overhang structure is completed being manufactured, and Step S2 specifically includes the following steps.

In Step 2.1, the first forming layer is processed and formed by adopting the S0 forming strategy.

In Step 2.2, the second forming layer is processed and formed.

In Step 2.2.1, a forming area of the second forming layer is divided into two areas, that is, the first forming area and the second forming area, correspondingly, the second forming area is arranged beyond a boundary contour of the first forming layer, and is an overhanging area of the second forming layer relative to the first forming layer.

In Step 2.2.2, the first forming area of the second forming layer is processed and formed by using the S0 forming strategy.

In Step 2.2.3, the second forming area of the second forming layer is processed and formed by using the S1 forming strategy.

In Step 2.3, the third forming layer is processed and formed.

In Step 2.3.1, it is determined that whether the width of the third forming layer is greater than the width of the second forming layer. In a case where the determined result shows that the width of the third forming layer is less than the width of the second forming layer, the third forming layer is processed and formed by adopting the S0 forming strategy; in a case where the determined result shows that the width of the third forming layer is greater than the width of the second forming layer, Step 2.3.2 is proceeded to.

In Step 2.3.2, the forming area of the third forming layer is divided into three areas, that is, the first to third forming areas, correspondingly; among the three forming areas included in the third forming layer, in the projection in the height direction, the second forming area can cover the overhanging area of the second forming layer, and the third forming area is set beyond a boundary contour of the second forming layer, and is an overhanging area of the third forming layer relative to the second forming layer.

In Step 2.3.3, the first forming area of the third forming layer is processed by adopting the S0 forming strategy.

In Step 2.3.4, the second forming area of the third forming layer is processed by adopting the S1 forming strategy.

In Step 2.3.5, the third forming area of the third forming layer is processed by adopting the S2 forming strategy.

In Step 2.4, the remaining forming layers are processed and formed in the same manner as the third forming layer in Step 2.3 until the N-th forming layer is reached, and the remelting strategy is adopted in the first forming area of the N-th forming layer.

Preferably, the metal powder is NiTi alloy powder; the value for the densification laser power $P_0$ ranges from 125 W to 150 W; the value for the low laser power $P_L$ ranges from 80 W to 100 W; and the value for the high laser power $P^+$ ranges from 175 W to 200 W.

Preferably, the value for the densification laser power $P_0$ is 125 W, the value for the low laser power $P_L$ is 80 W, and the value for the high laser power $P^+$ is 200 W.

Preferably, in a case where the remelting strategy is adopted in the first forming area of the N-th forming layer, the S2 forming strategy is adopted for empty scanning.

Preferably, an overhanging angle of the metal overhanging structure ranges from 20° to 90°.

Based on the above technical objectives, the present disclosure has the following advantages in comparison with the prior art.

1. In comparison with the traditional fixed laser process parameter forming, a "high and low power alternating" forming strategy is adopted in the method for manufacturing laser additive material of the metal non-supported overhanging structure provided by the present disclosure adopts, which solves the current problems of rough surface and severe slag of the non-supported overhanging structure.

2. The method for manufacturing the non-support laser additive material applied to the difficult-to-machine overhanging structure in the easily-deformed metal material provided by the present disclosure, ensures that the melt infiltration is relative light under a low power, and the pre-bonded powder is fully melted under a high power, while weakening the slag phenomenon under a high laser energy input.

DESCRIPTION OF THE EMBODIMENTS

The technical solutions in the embodiments of the present disclosure are clearly and completely described in the following combined with the drawings in the embodiments of the present disclosure. Obviously, the described embodiments are merely one part of the embodiments of the present disclosure, rather than all the embodiments. The following descriptions of at least one exemplary embodiment are actually merely illustrative and are by no means any limitation to the present disclosure and its application or use. Based on the embodiments in the present disclosure, all other embodiments obtained by a person skilled in the art without creative efforts are within the protection scope of the present disclosure. Unless otherwise specified, the relative arrangement, expressions and numerical values for the components and steps described in these embodiments do not limit the scope of the present disclosure. The techniques, methods and equipment known to a person skilled in the art may not be discussed in detail, but in appropriate cases, the techniques, methods and equipment should be regarded as one part of the description. In all embodiments shown and discussed here, an arbitrary specific value should be interpreted as merely exemplary, rather than as a limitation. Therefore, other examples of the exemplary embodiments may have different values.

When the laser additive material is adopted to manufacture and form arbitrary metal powder, the laser power thereof is generally equipped with three characteristic ranges. The first range is the densification laser power $P_O$, the densification laser power $P_O$ can ensure that the metal powder of the current forming layer is fully melted and densified; the second range is the low laser power $P_L$, the low laser power $P_L$ can ensure that the metal powder of the current forming layer is partially melted, thereby the metal powder forms a loose sintered state; and the third range is the high laser power $P^+$, the high laser power P+ can ensure that the covered metal powder of the previous forming layer is re-melted in a case where metal powder of the current forming layer is completely melted.

Figures 2, 3:
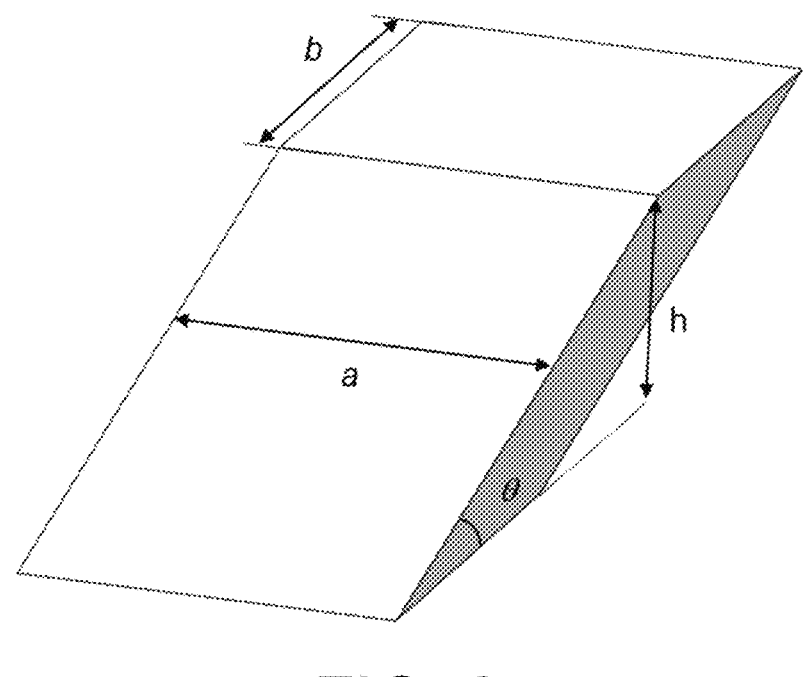
FIG. 2 illustrates a schematic structural diagram of a metal non-supported overhanging structure to be printed and formed of the present disclosure.
FIG. 3 illustrates a surface morphology of NiTi alloy components formed by LPBF at different laser powers.

The existing laser additive material is adopted to manufacture and form the metal non-supported overhanging structure as illustrated in FIG. 3. In a case where the densification laser power $P_O$ is used to form the various forming layers of the metal non-supported overhanging structure during the process of manufacturing laser additive material, stratification or looseness between the forming layers is likely to occur due to insufficient metallurgical bonding between the upper and lower forming layers; in a case where the high laser power $P^+$ is directly used to form the various forming layers of the metal non-supported overhanging structure, high temperature is generated instantly, molten metal is prone to flow deformation or collapse, and local overheating makes it difficult for heat to diffuse and conduct in time, easily causing thermal stress concentration and leading to warping deformation.

To this end, a method for manufacturing a non-support laser additive material applied to a difficult-to-machine overhanging structure in an easily-deformed metal material is provided in the present disclosure, forming a metal non-supported overhanging structure by adopting a laser powder melting technology, and in a process of laser-melting metal powder layer by layer to form forming layers of the metal non-supported overhanging structure, when a current forming layer is equipped with an overhanging area relative to a previous forming layer, the overhanging area of the current forming layer is formed by a S1 forming strategy, S0 that the metal powder forms a loose bonding state and reduces the infiltration of the melt; when the previous forming layer is equipped with an overhanging area, an area where the overhanging area of the current forming layer overlaps with that of the previous forming layer is formed by a S2 forming strategy, S0 as to fully melt the pre-bonded powder formed by sintering the overhang area of the previous forming layer, and the remaining area is formed by the S0 forming strategy. The S0 forming strategy is a fixed power forming strategy, and the adopted laser power is the densification laser power $P_O$, and the densification laser power $P_O$ can ensure that the metal powder of the current forming layer is fully melted and densified. the S1 forming strategy is a low power forming strategy, and the adopted laser power is the low laser power $P_L$, and the low laser power $P_L$ can ensure that the metal powder of the current forming layer is partially melted; the S2 forming strategy is a high power forming strategy, and the adopted laser power is the high laser power $P^+$, and the high laser power $P^+$ can ensure that the metal powder in the third forming area of the previous forming layer is re-melted, in a case where the metal powder of the current forming layer is completely melted; the densification laser power $P_O$, the low laser power $P_L$, and the high laser power $P^+$ satisfy that $P_L<P_O<P^+$.

It can be seen that the present disclosure increases the bonding force between metal powders by partially sintering the overhanging area at a low power in advance, provides a good bonding interface for the subsequent high-power re-melting, which is beneficial to interlayer bonding, and enhances the stability of the overhanging area. Therefore, by using the low power, the metal powder is formed into a loose sintered state, which provides a bonding basis for the subsequent high-power scanning; when scanning the next layer, the overhanging area is re-melted by adopting a high laser power. Since the laser power exceeds the critical value for the densification laser power, it can ensure that the metal powder of the previous layer is fully melted. This "high and low power alternating" forming strategy not merely ensures the stability of the overhanging area, but also takes into account the densification quality of other areas.

Figure 1:
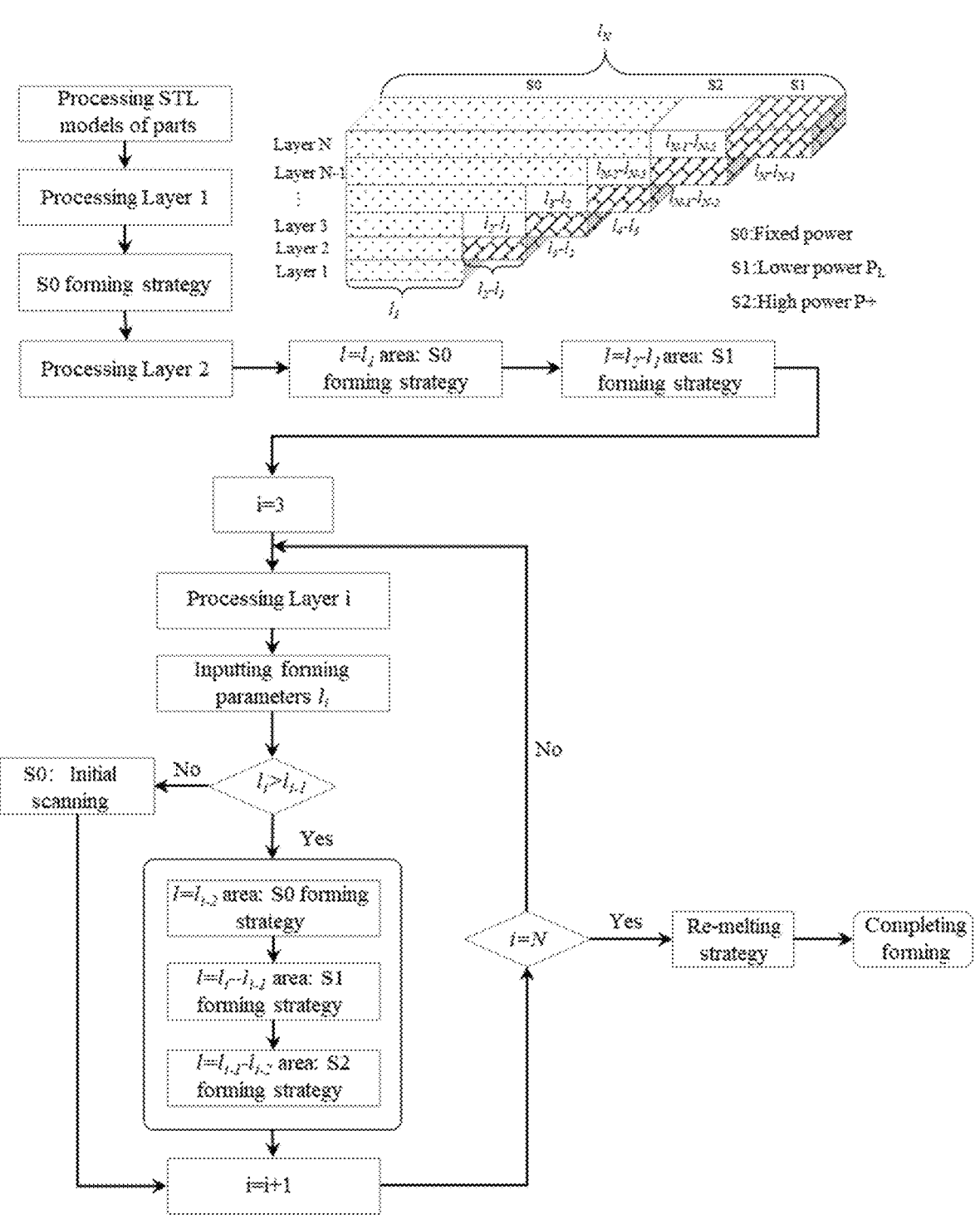
FIG. 1 illustrates a flow chart of a method for manufacturing a non-support laser additive material applied to a difficult-to-machine overhanging structure in an easily-deformed metal material of the present disclosure.

Specifically, a metal non-supported overhanging structure is formed by adopted a laser powder melting, as illustrated in FIG. 1, and includes the following steps.

In Step 1, the metal overhanging structure is sliced:

The metal overhanging structure is divided into N forming layers, and the forming layers are sequentially recorded from bottom to top as a first forming layer, a second forming layer, . . . an i-th forming layer, . . . and a N-th forming layer, where N is a positive integer, i∈N.

The forming area of each layer is denoted as $l_i$(i=1, 2, . . . N).

In Step 2, the metal overhanging structure is manufactured by using the laser additive material.

The metal powder is melted by the laser layer by layer to form each forming layer until a manufacturing of the additive material of the metal overhang structure is completed, and the Step S2 specifically includes the following steps:

In Step 2.1, the first forming layer is processed and formed by adopting the S0 forming strategy.

In Step 2.2, the second forming layer is processed and formed.

In Step 2.2.1, a forming area of the second forming layer is divided into two areas, that is, the first forming area and the second forming area, correspondingly, among the two forming areas included in the second forming layer, the first forming area can overlap with the first forming layer in the height direction projection, and the second forming area is set beyond the boundary contour of the first forming layer; it can be seen that, relative to the first forming layer, the second forming area of the second forming layer is the overhanging area of the second forming layer relative to the first forming layer.

In Step 2.2.2, the first forming area of the second forming layer is processed and formed by using the S0 forming strategy.

In Step 2.2.3, the second forming area of the second forming layer is processed and formed by using the S1 forming strategy.

In Step 2.3, the third forming layer is processed and formed.

In Step 2.3.1, it is determined that whether the width of the third forming layer is greater than the width of the second forming layer. In a case where the determined result shows that the width of the third forming layer is less than the width of the second forming layer, the third forming layer is processed and formed by adopting the S0 forming strategy; in a case where the determined result shows that the width of the third forming layer is greater than the width of the second forming layer, Step 2.3.2 is proceeded to.

In Step 2.3.2, the forming area of the third forming layer is divided into three areas, that is, the first to third forming areas, correspondingly; among the three forming areas included in the third forming layer, in the projection in the height direction, the first forming area can overlap with the second forming layer and the first forming layer respectively, the second forming area can overlap with the second forming layer, and the third forming area is set beyond the boundary contour of the second forming layer; it can be seen that the second forming area of the third forming layer covers the overhanging area of the second forming layer, and the third forming area of the third forming layer is the overhanging area of the third forming layer relative to the second forming layer.

In Step 2.3.3, the first forming area of the third forming layer is processed by adopting the S0 forming strategy.

In Step 2.3.4, the second forming area of the third forming layer is processed by adopting the S1 forming strategy.

In Step 2.3.5, the third forming area of the third forming layer is processed by adopting the S2 forming strategy.

In Step 2.4, the remaining forming layers are processed and formed in the same manner as the third forming layer in Step 2.3 until the N-th forming layer is reached, and the remelting strategy is adopted in the first forming area of the N-th forming layer.

It can be seen that in a case where i≥3, before processing and forming the current forming layer, it is necessary to determine whether the current forming layer has an overhanging area relative to the previous forming layer. If there is no overhanging area, the S0 forming strategy is adopted to process and form the current forming layer, otherwise, Step 2.3.2 is proceed to.

Based on the above technical routes, in view of the NiTi alloy powder, the surface morphology diagram formed by LPBF at different laser powers as shown in Table 1 is illustrated in FIG. 1.

TABLE 1

NiTi alloy powder formed by LPBF at different laser powers

| Laser power (W) | Scanning speed (mm/s) | Scanning spacing (μm) | Scan layer thickness (μm) |
|---|---|---|---|
| 80 | 1400 | 60 | 30 |
| 100 | | | |
| 125 | | | |
| 150 | | | |
| 175 | | | |
| 200 | | | |

It can be found that when the laser power ranges from 125 W to 150 W, the NiTi alloy formed by LPBF is equipped with fewer internal pores and the best forming quality. Therefore, the densification process window of manufacturing the NiTi alloy by the laser additive material ranges from 125 W to 150 W. In a case where the laser power range from 80 W to 100 W, the laser input energy is seriously insufficient, resulting in the inability to completely melt the metal powder, and the formed molten pool with poor fluidity and spreadability, making it difficult to achieve a good interlayer bonding. Therefore, a large number of unfused void defects are generated inside the NiTi alloy formed by LPBF at the low laser power. In a case where the laser power exceeds 175 W, the high laser energy input intensifies the evaporation of liquid metal, and the solubility of these evaporated metal gases in the molten pool is greatly improved. During the rapid solidification process, these gases cannot escape completely, but are quickly frozen inside the metal matrix, which will also form a large number of pore defects. Therefore, in order to obtain a dense NiTi alloy, the laser power must be kept in the range from 125 W to 150 W to ensure complete melting of the powder and reduce the formation of pores.

The method for manufacturing non-supported metal additive material of the metal overhanging structure based on powder pre-bonding of the present disclosure requires that the metal powder forms a loose sintered state at a low power, and then uses a high power to scan the same area of the next forming layer to fully melt the pre-sintered powder. Therefore, for the overhanging area of the NiTi alloy components, the low laser power is selected in a range from 80 W to 100 W. At this time, the laser input energy is insufficient, so that the metal powder is partially melted into a bonding state; then in a case where the same area of the next forming layer is scanned, the high laser energy input is adopted to ensure that the metal powder of the previous layer is fully melted, in a case where the high laser power is selected in range from 175 W to 200 W, exceeding the densification laser power of 125 W, and the laser energy is sufficient to fully melt the metal powder of the previous layer; in view of the non-overhanging area, the laser power is selected in a range from 125 W to 150 W to ensure the high densification.

The technical solutions of the present disclosure are described in detail below in combination with various embodiments and comparative embodiments.

Embodiment 1

The schematic diagram of a metal non-supported overhanging structure with an overhanging angle of 60° is illustrated in FIG. 2, and specific structural parameters are shown in the following table. The material adopted to form the overhanging structure is NiTi alloy, and the structure is formed by using the laser powder bed melting equipment and the forming parameters are that laser power ranges from 80 W to 200 W, the scanning speed is 1400 mm/s, the scanning spacing is 60 μm, and scanning layer thickness is 30 μm.

TABLE 2

Structural parameters for Embodiment 1

| a (mm) | b (mm) | h (mm) | θ (°) |
|---|---|---|---|
| 5 | 5 | 6 | 60 |

The forming process specifically includes the following steps.

In Step 1, the STL model of the metal non-supported overhanging structure with an overhanging angle of 60° is imported into the 3D printing slicing software and is sliced by a thickness of 30 μm per layer, for a total of 200 layers.

In Step 2, the first layer is formed by adopting the S0 forming strategy, the laser power is set to 125 W, and other process parameters are kept unchanged.

In Step 3, in the second layer, the area exceeding the area of the first layer is formed by S1 forming strategy, and the laser power is set to 80 W; the remaining area is formed by the S0 forming strategy, and the laser power is set to 125 W, and other process parameters are kept unchanged.

In Step 4, in the third layer, the area exceeding the second layer is formed by the S1 forming strategy, and the laser power is set to 80 W; the same area as the 80 W formed area of the second layer is formed by the S2 forming strategy, and the laser power is set to 200 W; the remaining area is formed by the S0 forming strategy, and the laser power is set to 125 W, and other process parameters are kept unchanged.

In Step 5, in the fourth layer, the area exceeding the third layer is set to be formed by S1 forming strategy with a laser power of 80 W; the same area as the 80 W formed area of the third layer is formed by S2 forming strategy with a set laser power of 200 W; the remaining area is formed by S0 forming strategy with a set laser power of 125 W, and other process parameters are kept unchanged.

In Step 6, in the fifth layer to the 200-th layer, the cyclic scanning is executed in the form of "the area of the N-th layer exceeding the N-1-th layer is formed by the S1 forming strategy, and the laser power is set to 80 W; the same area as the 80 W formed area of the N-1-th layer is formed by S2 forming strategy, and the laser power is set to 200 W; the remaining area is formed by S0 forming strategy, and the laser power is set to 125 W", and other process parameters are kept unchanged.

In Step 7, the 200-th layer is scanned at a high power of 200 W, and other process parameters are kept unchanged.

Figure 4:
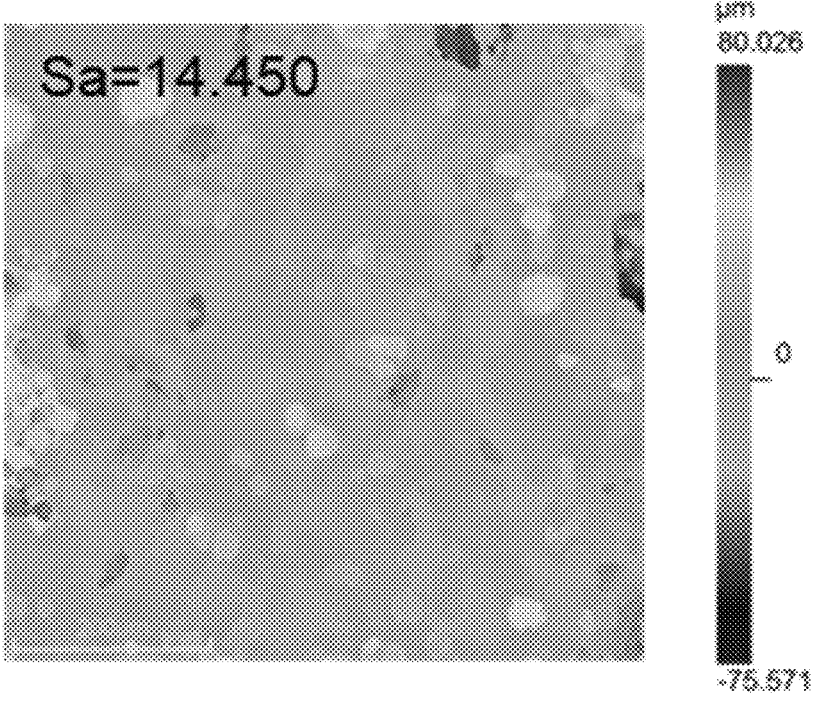
FIG. 4 illustrates a surface roughness diagram of Embodiment 1 of the present disclosure.

After Step 1 to Step 7, the surface roughness diagram of the metal non-supported overhanging structure obtained in this embodiment can be referred to FIG. 4.

In order to further clarify the effects of the present disclosure, the present disclosure also provides comparative embodiments.

Comparative Embodiment 1

In comparison with Embodiment 1, the differences of this comparative embodiment are that each forming layer of the entire overhanging structure is formed by S0 forming strategy, the laser power is fixed to 125 W, and other process parameters are kept unchanged.

The forming process specifically includes the following steps.

In Step 1, the STL model of the metal non-supported overhanging structure with an overhanging angle of 60° is imported into the 3D printing slicing software and is sliced by a thickness of 30 μm per layer, for a total of 200 layers.

In Step 2, the laser power of each layer is set to 125 W, and other process parameters are kept unchanged.

Figure 5:
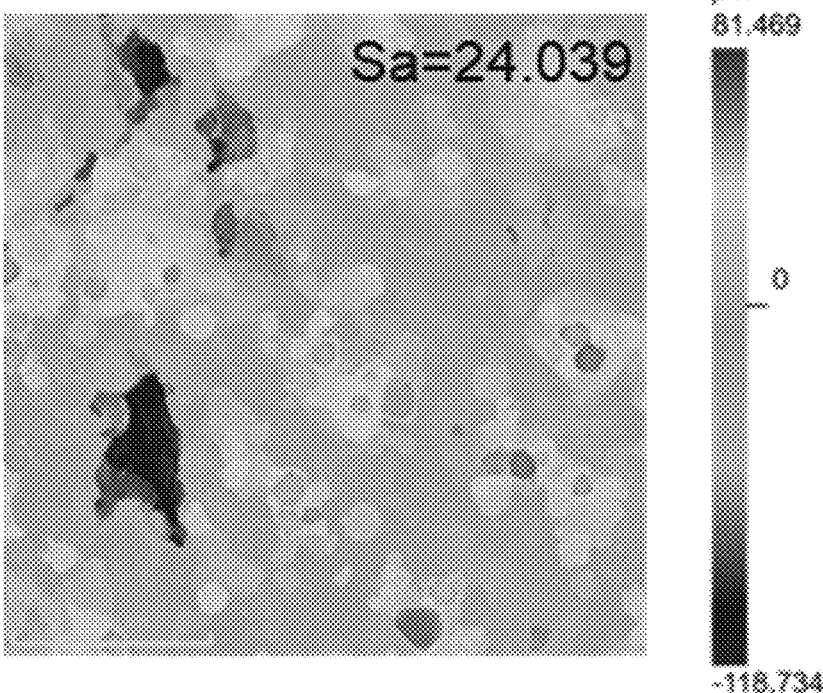
FIG. 5 illustrates a surface roughness diagram of Comparative Embodiment 1 of the present disclosure.

After Step 1 to Step 2, the surface roughness diagram of the metal non-supported overhanging structure obtained in this comparative embodiment can be referred to FIG. 5.

Embodiment 2

In a metal non-supported overhanging structure with an overhanging angle of 45°, the specific structural parameters are as shown in the following table. The material adopted to form the overhanging structure is NiTi alloy, and the structure is formed by adopting the laser powder bed melting equipment and the forming parameters are that laser power ranges from 80 W to 200 W, the scanning speed is 1400 mm/s, the scanning spacing is 60 μm, and scanning layer thickness is 30 μm.

TABLE 3

| Structural parameters for Embodiment 2 | | | |
| --- | --- | --- | --- |
| a (mm) | b (mm) | h (mm) | θ (°) |
| 5 | 5 | 6 | 45 |

The forming process specifically includes the following steps.

In Step 1, the STL model of the metal non-supported overhanging structure with an overhanging angle of 45° is imported into the 3D printing slicing software and is sliced by a thickness of 30 μm per layer, for a total of 200 layers.

In Step 2, the first layer is formed by using the S0 forming strategy, the laser power is set to 125 W, and other process parameters are kept unchanged.

In Step 3, in the second layer, the area exceeding the area of the first layer is formed by S1 forming strategy, and the laser power is set to 80 W; the remaining area is formed by the S0 forming strategy, and the laser power is set to 125 W, and other process parameters are kept unchanged.

In Step 4, in the third layer, the area exceeding the second layer is formed by the S1 forming strategy, and the laser power is set to 80 W; the same area as the 80 W formed area of the second layer is formed by the S2 forming strategy, and the laser power is set to 200 W; the remaining area is formed by the S0 forming strategy, and the laser power is set to 125 W, and other process parameters are kept unchanged.

In Step 5, in the fourth layer, the are exceeding the third layer is formed by S1 forming strategy with a laser power of 80 W; the same area as the 80 W formed area of the third layer is formed by S2 forming strategy with a set laser power of 200 W; the remaining area is formed by S0 forming strategy with a set laser power of 125 W, and other process parameters are kept unchanged.

In Step 6, in the fifth layer to the 200-th layer, the cyclic scanning is executed in the form of "the area of the N-th layer exceeding the N-1-th layer is formed by the S1 forming strategy, and the laser power is set to 80 W; the same area as the 80 W formed area of the N-1-th layer is formed by S2 forming strategy, and the laser power is set to 200 W; the remaining area is formed by S0 forming strategy, and the laser power is set to 125 W", and other process parameters are kept unchanged.

In Step 7, the 200-th layer is scanned at a high power of 200 W, and other process parameters are kept unchanged.

Figure 6:
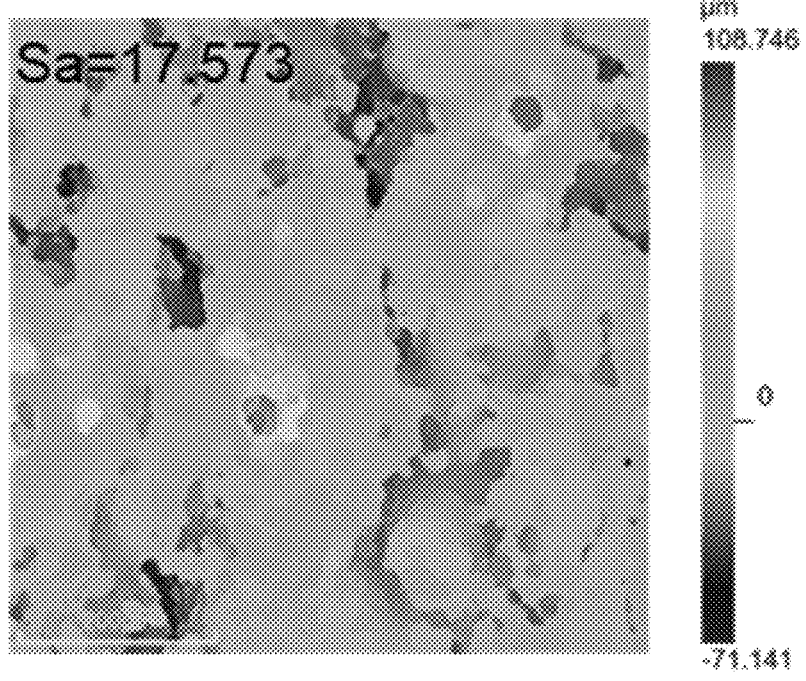
FIG. 6 illustrates a surface roughness diagram of Embodiment 2 of the present disclosure.

After Step 1 to Step 7, the surface roughness diagram of the metal non-supported overhanging structure obtained in this embodiment can be referred to FIG. 6.

In order to further clarify the effects of the present disclosure, the present disclosure also provides a comparative embodiment.

Comparative Embodiment 2

In comparison with Embodiment 2, the differences are that each forming layer of the entire overhanging structure is formed by S0 forming strategy, the laser power is fixed to 125 W, and other process parameters are kept unchanged.

The forming process specifically includes the following steps.

In Step 1, the STL model of the metal non-supported overhanging structure with an overhanging angle of 45° is imported into the 3D printing slicing software and is sliced by a thickness of 30 μm per layer, for a total of 200 layers.

In Step 2, the laser power of each layer is set to 125 W, and other process parameters are kept unchanged.

Figure 7:
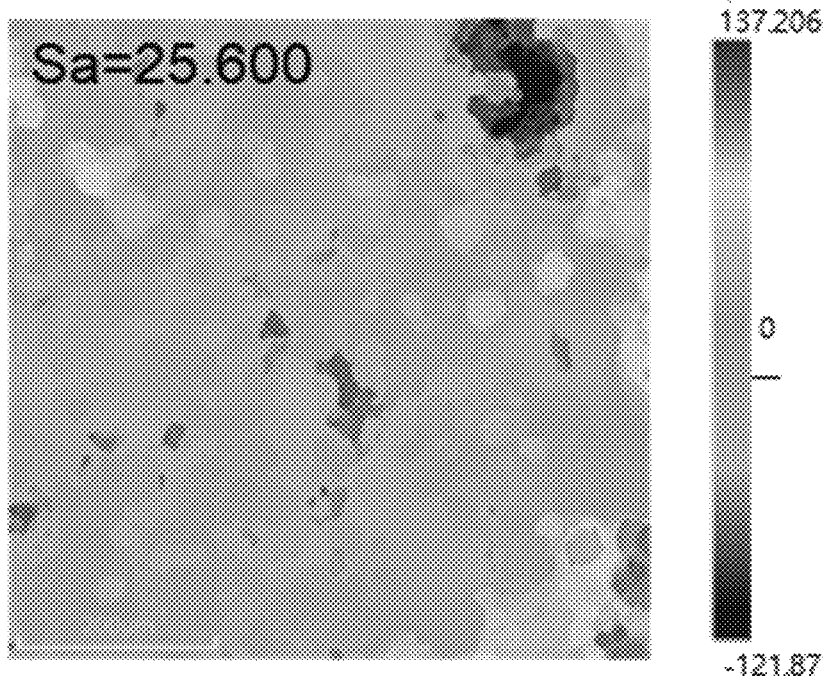
FIG. 7 illustrates a surface roughness diagram of Comparative Embodiment 2 of the present disclosure.

After Step 1 to Step 2, the surface roughness diagram of the metal non-supported overhanging structure obtained in this comparative embodiment can be referred to FIG. 7.

Embodiment 3

In a metal non-supported overhanging structure with an overhanging angle of 30°, the specific structural parameters are as shown in the following table. The material adopted to form the overhanging structure is NiTi alloy, and the structure is formed by adopting the laser powder bed melting equipment and the forming parameters are that laser power ranges from 80 W to 200 W, the scanning speed is 1400 mm/s, the scanning spacing is 60 μm, and scanning layer thickness is 30 μm.

TABLE 4

| Structural parameters for Embodiment 3 | | | |
| --- | --- | --- | --- |
| a (mm) | b (mm) | h (mm) | θ (°) |
| 5 | 5 | 6 | 30 |

The forming process specifically includes the following steps.

In Step 1, the STL model of the metal non-supported overhanging structure with an overhanging angle of 30° is imported into the 3D printing slicing software and is sliced by a thickness of 30 μm per layer, for a total of 200 layers.

In Step 2, the first layer is formed by adopting the S0 forming strategy, the laser power is set to 125 W, and other process parameters are kept unchanged.

In Step 3, in the second layer, the area exceeding the area of the first layer is formed by S1 forming strategy, and the laser power is set to 80 W; the remaining area is formed by the S0 forming strategy, and the laser power is set to 125 W, and other process parameters are kept unchanged.

In Step 4, in the third layer, the area exceeding the second layer is formed by the S1 forming strategy, and the laser power is set to 80 W; the same area as the 80 W formed area of the second layer is formed by the S2 forming strategy, and the laser power is set to 200 W; the remaining area is formed by the S0 forming strategy, and the laser power is set to 125 W, and other process parameters are kept unchanged.

In Step 5, in the fourth layer, the are exceeding the third layer is formed by S1 forming strategy with a laser power of 80 W; the same area as the 80 W formed area of the third layer is formed by S2 forming strategy with a set laser power of 200 W; the remaining area is formed by S0 forming strategy with a set laser power of 125 W, and other process parameters are kept unchanged.

In Step 6, in the fifth layer to the 200-th layer, the cyclic scanning is executed in the form of "the area of the N-th layer exceeding the N-1-th layer is formed by the S1 forming strategy, and the laser power is set to 80 W; the same area as the 80 W formed area of the N-1-th layer is formed by S2 forming strategy, and the laser power is set to 200 W; the remaining area is formed by S0 forming strategy, and the laser power is set to 125 W", and other process parameters are kept unchanged.

In Step 7, the 200-th layer is scanned at a high power of 200 W, and other process parameters are kept unchanged.

Figure 8:
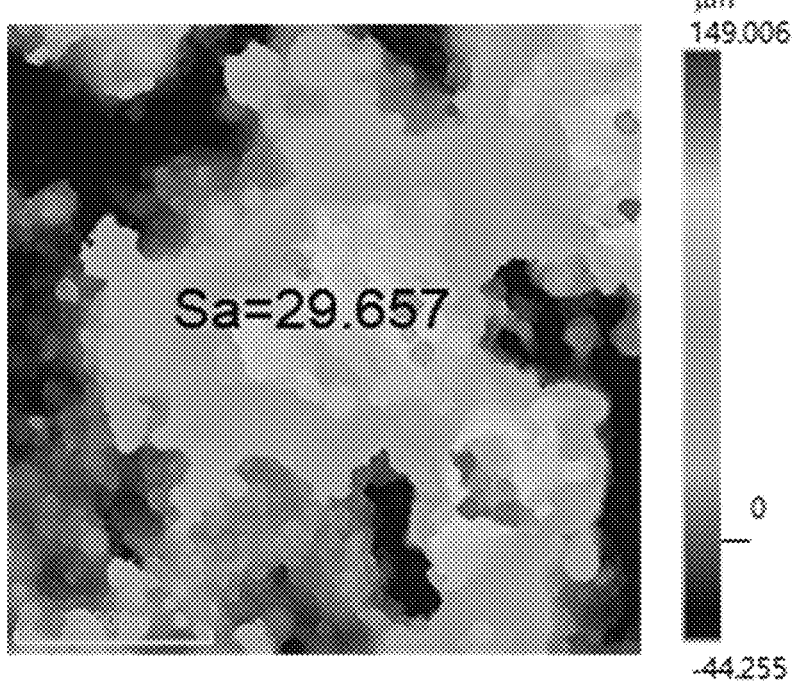
FIG. 8 illustrates a surface roughness diagram of Embodiment 3 of the present disclosure.

After Step 1 to Step 7, the surface roughness diagram of the metal non-supported overhanging structure obtained in this embodiment can be referred to FIG. 8.

In order to further clarify the effects of the present disclosure, the present disclosure also provides comparative embodiments.

Comparative Embodiment 3

In comparison with Embodiment 3, the differences are that each forming layer of the entire overhanging structure is formed by S0 forming strategy, the laser power is fixed to 125 W, and other process parameters are kept unchanged.

The forming process specifically includes the following steps.

In Step 1, the STL model of the metal non-supported overhanging structure with an overhanging angle of 30° is imported into the 3D printing slicing software and is sliced by a thickness of 30 μm per layer, for a total of 200 layers.

In Step 2, the laser power of each layer is set to 125 W, and other process parameters are kept unchanged.

Figure 9:
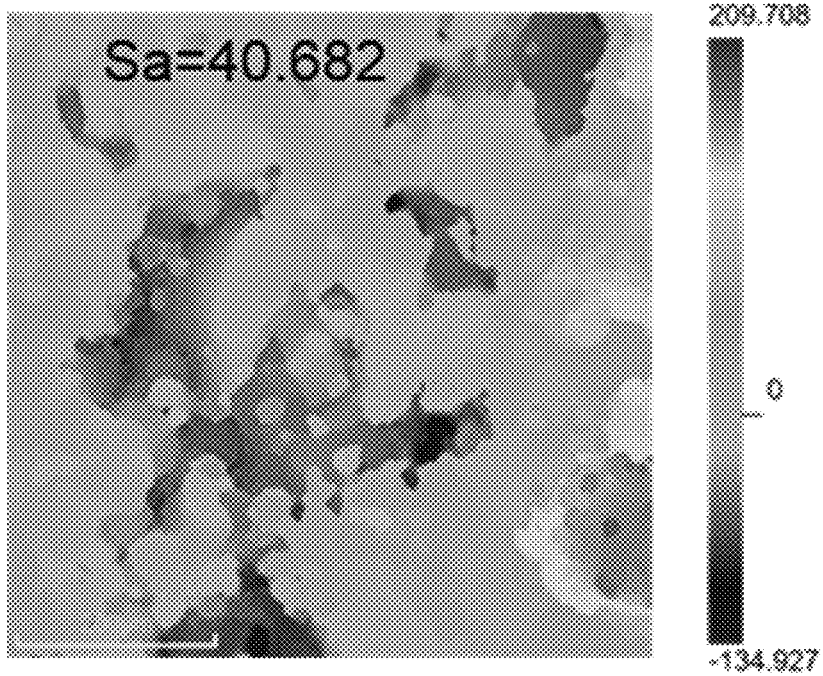
FIG. 9 illustrates a surface roughness diagram of Comparative Embodiment 3 of the present disclosure.

After Step 1 to Step 2, the surface roughness diagram of the metal non-supported overhanging structure obtained in this comparative embodiment can be referred to FIG. 9.

The method for characterizing the forming quality of the metal non-supported overhanging structure in Embodiments 1 to 3 and Comparative Embodiments 1 to 3, and the specific steps are as follows.

The surface roughness test of the metal non-supported overhanging structure manufactured by the laser additive material is executed by adopting a laser confocal scanning microscope.

TABLE 5

| Overhanging surface roughness test results of Embodiments 1 to 3 and Comparative Embodiments 1 to 3 | | | | | | |
| --- | --- | --- | --- | --- | --- | --- |
| Serial Number | Embodiment 1 | Embodiment 2 | Embodiment 3 | Comparative Embodiment 1 | Comparative Embodiment 2 | Comparative Embodiment 3 |
| Sa (μm) | 14.450 | 17.573 | 29.657 | 24.039 | 25.600 | 40.682 |

It can be seen from Table 5 that, in comparison with Comparative Embodiment 1, the surface roughness of the non-supported overhanging structure of Embodiment 1 is reduced by 39.9%.

It can be seen from Table 5 that, in comparison with Comparative Embodiment 2, the surface roughness of the non-supported overhanging structure of Embodiment 2 is reduced by 31.4%.

It can be seen from Table 5 that, in comparison with Comparative Embodiment 3, the surface roughness of the non-supported overhanging structure of Embodiment 3 is reduced by 27.1%.

It can be seen from the above results that the overhanging surface quality of the method for manufacturing the non-supported metal additive material with metal overhanging structure based on the powder pre-bonding in Embodiments 1 to 3 of the present disclosure is significantly improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for manufacturing a non-support laser additive material applied to an overhanging structure in a metal material, comprising: forming a metal non-supported overhanging structure by adopting a laser powder bed melting technology, wherein in a process of laser-melting metal powder layer by layer to form forming layers of the metal non-supported overhanging structure, a high and low power alternating forming strategy is adopted, when a current forming layer is equipped with an overhanging area relative to a previous forming layer, the overhanging area of the current forming layer is formed by a S1 forming strategy; when the previous forming layer is equipped with an overhanging area, an area where the overhanging area of the current forming layer overlaps with that of the previous forming layer is formed by a S2 forming strategy; and remaining areas are all formed by a S0 forming strategy;

the S0 forming strategy is a fixed power forming strategy, and an adopted laser power is a densification laser power $P_0$, and the densification laser power $P_0$ is capable of ensuring that metal powder of the current forming layer is fully melted and densified;

the S1 forming strategy is a low-power forming strategy, and an adopted laser power is a low laser power $P_L$, the low laser power $P_L$ is capable of ensuring that the metal powder of the current forming layer is partially melted to form pre-bonded powder, thereby increasing a bonding force between the metal powder, forming a loose bonding state of the metal powder, and reducing a melt infiltration;

the S2 forming strategy is a high-power forming strategy, and an adopted laser power is a high laser power $P^+$, the high laser power $P^+$ is capable of ensuring that the pre-bonded powder formed by sintering the overhanging area of the previous forming layer is re-melted to fully melt the pre-bonded powder, in a case where the metal powder of the current forming area is completely melted;

the densification laser power $P_0$, the low laser power $P_L$, and the high laser power $P^+$ satisfy that $P_L < P_0 < P^+$; and a value for the densification laser power $P_0$ ranges from 125 W to 150 W; a value for the low laser power $P_L$ ranges from 80 W to 100 W; a value for the high laser power $P^+$ ranges from 175 W to 200 W.

2. The method for manufacturing the non-support laser additive material applied to the overhanging structure in the metal material according to claim 1, wherein forming the metal non-supported overhanging structure by adopting the laser powder bed melting technology includes following steps:

step 1, slicing the metal overhanging structure: wherein the metal overhanging structure is divided into N forming layers, and the forming layers are sequentially recorded from bottom to top as a first forming layer, a second forming layer, . . . an i-th forming layer, . . . and a N-th forming layer;

step 2, manufacturing the metal overhanging structure by using the laser additive material, wherein the metal powder is melted by the laser layer by layer to form the forming layers until the additive material of the metal overhang structure is completed being manufactured, and Step S2 specifically includes following steps:

step 2.1, processing and forming, by adopting the S0 forming strategy, the first forming layer, wherein the first forming layer is a base layer that does not have an overhanging area;

step 2.2, processing and forming the second forming layer;

step 2.2.1, dividing a forming area of the second forming layer into two areas, that is, a first forming area and a second forming area, correspondingly, wherein the second forming area is arranged beyond a boundary contour of the first forming layer, and is an overhanging area of the second forming layer relative to the first forming layer; and remaining areas are the first forming area;

step 2.2.2, processing and forming, by using the S0 forming strategy, the first forming area of the second forming layer; and step 2.2.3, processing and forming, by using the S1 forming strategy, the second forming area of the second forming layer;

step 2.3: processing and forming the third forming layer, dividing a forming area of the third forming layer into three areas, that is, a first to a third forming areas, correspondingly; wherein in the three forming areas included in the third forming layer, when projected in a height direction, the second forming area overlaps with the overhanging area of the second forming layer, and the third forming area is set beyond a boundary contour of the second forming layer, and is an overhanging area of the third forming layer relative to the second forming layer; and the remaining area is the first forming area;

processing, by adopting the S0 forming strategy, the first forming area of the third forming layer;

processing, by adopting the S2 forming strategy, the second forming area of the third forming layer; and processing, by using the S1 forming strategy, the third forming area of the third forming layer;

step 2.4, processing and forming the remaining forming layers in the same manner as the third forming layer in step 2.3 until the N-th forming layer is reached.

3. The method for manufacturing the non-support laser additive material applied to the overhanging structure in the metal material according to claim 2, wherein the value for the densification laser power $P_0$ is 125 W, the value for the low laser power $P_L$ is 80 W, and the value for the high laser power $P^+$ is 200 W.

4. The method for manufacturing the non-support laser additive material applied to the overhanging structure in the metal material according to claim 1, wherein an overhanging angle of the non-supported metal overhanging structure ranges from 20° to 90°.

* * * * *